Jan. 19, 1937.  H. G. WARNKE  2,068,043
PRESSER ELECTRODE FOR ELECTRIC WELDING MACHINES
Filed April 15, 1935
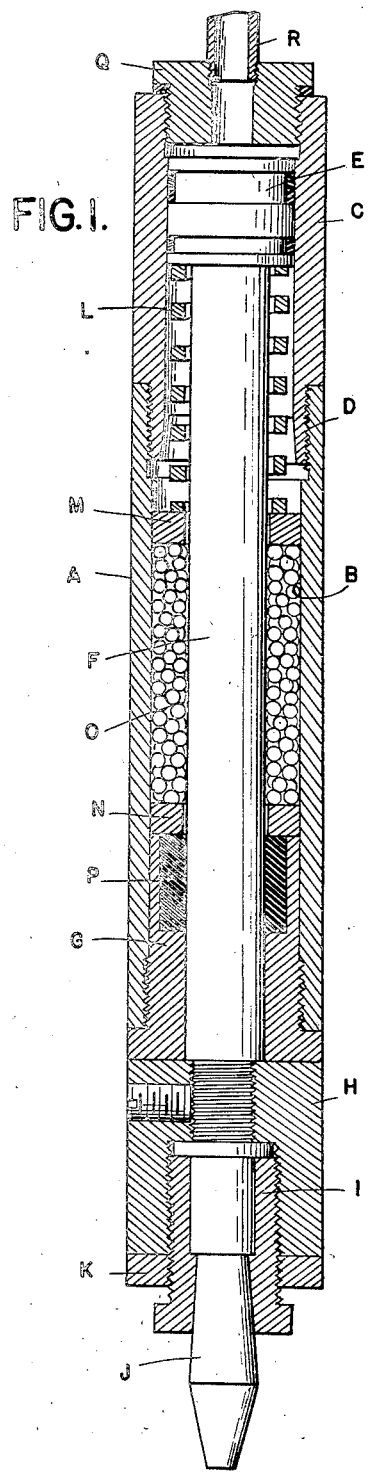
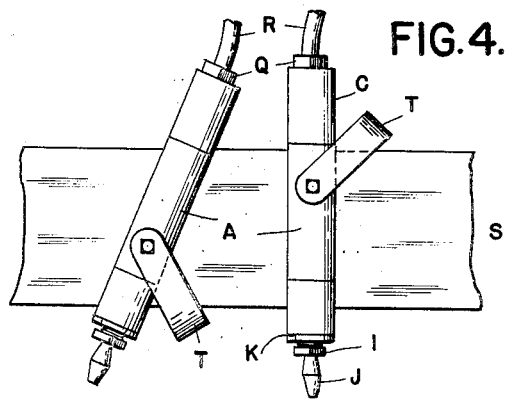
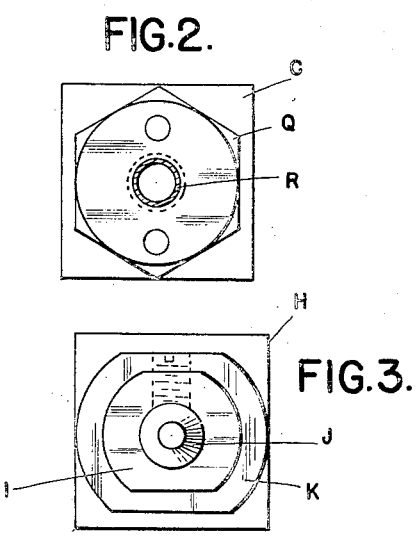
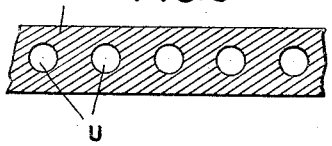
*INVENTOR*
HANS G. WARNKE
BY  Whittemore Hulbut
Whittemore & Belknap
*ATTORNEYS*

Patented Jan. 19, 1937

2,068,043

UNITED STATES PATENT OFFICE 2,068,043

PRESSER ELECTRODE FOR ELECTRIC WELDING MACHINES

Hans G. Warnke, Detroit, Mich., assignor to Multi-Hydromatic Welding & Manufacturing Company, Detroit, Mich., a corporation of Michigan Application April 15, 1935, Serial No. 16,487

2 Claims. (Cl. 219—4)

The invention relates to electric welding machines of the type in which the work is placed between a stationary electrode and a series of movable presser electrodes which are successively actuated into contact and simultaneously supplied with welding current. With certain constructions of machines of the above type the presser electrodes are individually actuated by hydraulic motors which in turn are actuated by fluid controlled by mechanically operated valves. It is also necessary to electrically connect the electrode with the source of welding current which is accomplished through the medium of a flexible conductor connected to a bus bar. The mechanism which controls the valves also controls the primary circuit of a transformer, the secondary circuit of which is connected to the bus bar and to the stationary electrode. Thus in operation each movable electrode is first pressed into contact with the work upon the stationary electrode after which current is supplied to the transformer and effects the welding.

It is the object of the present invention to obtain a simplified construction of presser electrode and its actuating means and one which dispenses with the necessity of a flexible conductor for conveying the welding current to the electrode. To this end the invention consists in the construction as hereinafter set forth.

In the drawing:

Fig. 1 is a central longitudinal section through my improved presser electrode unit;

Fig. 2 is a top plan view thereof;

Fig. 3 is a bottom plan view.

Fig. 4 is a side elevation showing a plurality of units attached to a bus bar;

Fig. 5 is a horizontal section through a bus bar showing a modification of my invention.

My improved unit comprises a body portion A preferably rectangular having a cylindrical bore B. At the upper end of the body A is a hydraulic cylinder C which is connected thereto by the threaded nipple D. Within this cylinder is a piston E having a downwardly extending rod or shank F which passes through the hollow body A and through a bushing G at the lower end thereof. Beneath the bushing G the rod F is connected to a head H preferably by a threaded engagement. Secured in this head is a socket or bushing I for receiving the welder electrode J and to provide for adjustment the bushing I has a threaded engagement with the head H and is clamped in adjusted position by a lock nut K. Surrounding the rod F within the cylinder C is a helical spring L, the upper end of which bears against the piston, while its lower end abuts against a washer M within the hollow body A. A similar washer N is arranged adjacent to the bushing G and between these washers the annular space between the member A and the rod F is filled with an electrically conductive medium, preferably balls or pellets O formed of copper or other conductive metal. These pellets form in effect a mechanical fluid which under the pressure of the spring L will be forced into close contact with each other and with the surfaces of the member A and rod F. A packing P is placed around the rod F preferably in a recess in the bushing G to prevent escape of fluid from the cylinder around the rod F.

The unit constructed as just described may be mounted directly upon the bus bar through which the welding current is to be conveyed or upon any other electrically conductive support. The upper end of the cylinder C has a cap Q to which is connected the conductor R leading to the valve mechanism (not shown). The unit thus mounted is actuated by fluid supplied through the conduit R to the cylinder C which depresses the piston E against the yielding resistance of the spring L, thereby lowering the head H and pressing the electrode J in contact with the work. Subsequent to this operation, welding current is supplied to the bus bar and is conducted through the body A and pellets O to the rod F from which it passes through the head H and socket I to the electrode J. As current is cut off during the movement of the rod F by the piston E, there will be no tendency to produce arcing between the balls O and after the electrode is in firm contact with the work the pressure of the spring L on the washer M and through the latter on the balls will hold these in good electrical contact with each other. Thus I am enabled to dispense with any flexible conductors, which are cumbersome on account of the large volume of welding current which must pass therethrough.

As shown in Fig. 4, the units may be attached to a bus bar S to extend at various angles according to the particular character of the work. Attachment may be made in any suitable way, as for instance by temporary clamps T, which permit of shifting the units to different positions according to the work to be performed. In Fig. 5 I have shown a modified construction in which the bus bar S' is used for the member A, being provided with a series of bores U for the passage of the piston rod F. The hydraulic cylinders are attached to the bar in the same manner as previously described. With all of these constructions the necessity for a flexible conductor to convey the welding current is dispensed with.

What I claim as my invention is:

1. In a welding machine, a presser electrode welding unit comprising a hollow body of electrically conductive material having a cylinder at one end and a bushing at the opposite end, a piston in said cylinder, a piston rod extending from said piston through said hollow body and bushing, an electrode mounted at the lower end of said rod, electrically conductive material filling the annular space between said hollow body and rod and a spring within said cylinder having one end bearing against said piston and the opposite end abutting upon said electrically conductive material.

2. In a welding machine, a presser electrode welding unit comprising a hollow body of electrically conductive material having a cylinder at one end and a bushing at the opposite end, a piston in said cylinder, a piston rod extending from said piston through said hollow body and bushing, an electrode mounted at the lower end of said rod, pellets of electrically conductive material filling the annular space between said hollow body and rod, a spring within said cylinder surrounding said rod having one end bearing against said piston, and an abutment for the opposite end of said spring bearing against said pellets whereby fluid pressure in said cylinder will actuate said piston against the yielding resistance of said spring, and said pellets under the pressure of said spring will form a conductive medium for the welding current.

HANS G. WARNKE.